United States Patent
Shanbhogue et al.

(10) Patent No.: US 10,671,542 B2
(45) Date of Patent: Jun. 2, 2020

(54) APPLICATION EXECUTION ENCLAVE MEMORY METHOD AND APPARATUS

(71) Applicant: Intel Corporation, Santa Clara, CA (US)

(72) Inventors: Vedvyas Shanbhogue, Austin, TX (US); Ittai Anati, Haifa (IL); Francis X. McKeen, Portland, OR (US); Krystof C. Zmudzinski, Forest Grove, OR (US); Meltem Ozsoy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 15/200,796

(22) Filed: Jul. 1, 2016

(65) Prior Publication Data

US 2018/0004675 A1 Jan. 4, 2018

(51) Int. Cl.
*G06F 12/1009* (2016.01)
*G06F 3/06* (2006.01)
*G06F 12/14* (2006.01)

(52) U.S. Cl.
CPC ........ *G06F 12/1009* (2013.01); *G06F 3/0623* (2013.01); *G06F 3/0631* (2013.01); *G06F 3/0673* (2013.01); *G06F 12/1425* (2013.01); *G06F 12/1475* (2013.01); *G06F 2212/1052* (2013.01); *G06F 2212/657* (2013.01)

(58) Field of Classification Search
CPC .. G06F 12/1009; G06F 12/109; G06F 3/0604; G06F 12/12; G06F 12/2212
See application file for complete search history.

(56) References Cited

U.S. PATENT DOCUMENTS

| 7,124,170 B1* | 10/2006 | Sibert | G06F 12/145 709/216 |
| 7,512,769 B1* | 3/2009 | Lowell | G06F 9/461 711/165 |
| 2003/0204693 A1* | 10/2003 | Moran | G06F 12/1483 711/163 |
| 2008/0244155 A1* | 10/2008 | Lee | G06F 12/145 711/6 |

(Continued)

*Primary Examiner* — Tuan V Thai
*Assistant Examiner* — Alexander J Yoon
(74) *Attorney, Agent, or Firm* — Schwabe, Williamson & Wyatt, P.C.

(57) ABSTRACT

Apparatuses, methods and storage medium associated with application execution enclave memory page cache management, are disclosed herein. In embodiments, an apparatus may include a processor with processor supports for application execution enclaves; memory organized into a plurality of host physical memory pages; and a virtual machine monitor to be operated by the processor to manage operation of virtual machines. Management of operation of the virtual machines may include facilitation of mapping of virtual machine-physical memory pages of the virtual machines to the host physical memory pages, including maintenance of an unallocated subset of the host physical memory pages to receive increased security protection for selective allocation to the virtual machines, for virtualization and selective allocation to application execution enclaves of applications of the virtual machines. Other embodiments may be described and/or claimed.

17 Claims, 6 Drawing Sheets

(56) References Cited

U.S. PATENT DOCUMENTS

| | | | |
|---|---|---|---|
| 2008/0307188 A1* | 12/2008 | Franaszek | G06F 9/5016 |
| | | | 711/171 |
| 2011/0010483 A1* | 1/2011 | Liljeberg | G06F 12/1441 |
| | | | 711/6 |
| 2011/0099387 A1* | 4/2011 | Gremaud | G06F 12/1408 |
| | | | 713/190 |
| 2014/0025924 A1* | 1/2014 | Satoyama | G06F 12/1009 |
| | | | 711/209 |
| 2015/0324139 A1* | 11/2015 | Inoue | G06F 3/06 |
| | | | 711/165 |
| 2016/0239430 A1* | 8/2016 | Tsirkin | G06F 12/109 |
| 2017/0068455 A1* | 3/2017 | Xing | G06F 3/0605 |

* cited by examiner

APPLICATION EXECUTION ENCLAVE MEMORY METHOD AND APPARATUS

TECHNICAL FIELD

The present disclosure relates to the field of computing. More particularly, the present disclosure relates to application execution enclave memory page cache management method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Security, protection from malicious software, has emerged as a major concern of the computing art. It is expected that processors, e.g., some processors from Intel® Corporation of Santa Clara, Calif., will begin to provide support for isolated/protected execution environments to individual applications (also referred to as application execution enclaves or simply, enclaves). Accesses to the enclave memory areas (or referred to as enclave memory page cache) will be limited to codes resident in the enclaves only. Codes outside the enclave will have no access to enclave memory areas. For Intel® processors, the technology is currently known as SGX (Software Guard Extensions). For further information, see Intel® Software Guard Extensions Programming Reference, dated October, 2014.

It is expected that the isolation supports will include support for designating certain physical memory pages to receive increased security protection, e.g., encryption and integrity protection of its content, making a virtualization of the physical memory page with increased security protection in a virtual machine suitable for allocation as part of enclave memory page caches of application execution enclaves of applications of the virtual machine. For example, SGX will include support for an instruction for designating a physical memory page to receive increased security protection. If such physical memory pages with increased security protection were to be modified by other software beside the codes in application execution enclaves that were allocated the physical memory pages, it would lead to corruption of the physical memory pages. On a subsequent access by the code in the application execution enclave, an integrity error would be detected. And the detection of such integrity error would result in a machine check, leading to a system shutdown.

Such corruptions may also be caused indirectly by the operating system (OS) directing a device that it controls to write to the physical memory pages that have been designated to have higher security. Normally an OS prevents such corruptions of memory pages and the resultant shutdown by managing its translation tables to prevent untrusted software from causing such corruptions. However when such an OS is executing in a virtual machine, the virtual machine manager cannot rely on the guest OS not being malicious and intentionally causing such corruptions. Such corruptions leading to shutdown would cause denial of service to the entire platform as they call for all other virtual machines and the virtual machine manager itself to be shutdown. Thus a virtual machine manager should guard against such corruptions.

In the SGX embodiments, in order to guard against such corruptions, the virtual machine manager (VMM) may virtualize the SGX instructions used to designate physical pages to receive higher security and uses a set of page tables that it controls—the extended page tables (EPT) or the second level page tables—to prevent untrusted software from accessing the memory pages that have been designated to receive increased security protection. In order to prevent an OS from corrupting pages using devices it controls, the VMM makes use of an IO memory management unit (IOMMU). This IOMMU may reference the page tables provided by the VMM to determine the set of physical pages that a given device is allowed to access. Processors generally cache the virtual address to physical address translations in a translation lookaside buffer or TLB to avoid walking page tables on each access. The IOMMU generally cache the VM-physical page/address to host-physical page/address translations as obtained from the page tables created by the VMM in an input/output (I/O) translation lookaside buffer or IO TLB to avoid walking page tables on each access. Thus when an SGX instruction is used to designate a memory page to receive higher security, the VMM may update its EPT to deny access to this page from untrusted software i.e. software executing outside of an enclave. However at the time of this designation there might already be a translation to that page in the TLB and/or the IO TLB, thus the TLB and/or the IO TLB may not observe the restrictions put in place by the EPT.

Thus, to avoid such integrity errors leading to system shutdown, on designation of a physical memory page to receive increased security protection, mappings of any other virtual addresses to the physical memory page (direct mappings or indirect mappings via a virtual machine-physical memory page (also referred to as a guest physical memory page)), would need to be invalidated. In particular, for implementations with the guest OS of a virtual machine maintaining its own translation table with mapping entries to map virtual addresses of a virtual machine to virtual machine-physical memory pages of the virtual machine, the stale mapping entries created by a guest OS' mapping table in the processor TLB or the IO TLB would need to be removed (also referred to as a TLB shootdown for some implementations). However, the amount of overhead incurred for removing such stale mapping entries from TLB of all logical processors where that guest OS may have executed as well as from any I/O TLB whenever a physical memory page is designated to receive increased security protection, which could be frequent, could be significant, and impact performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
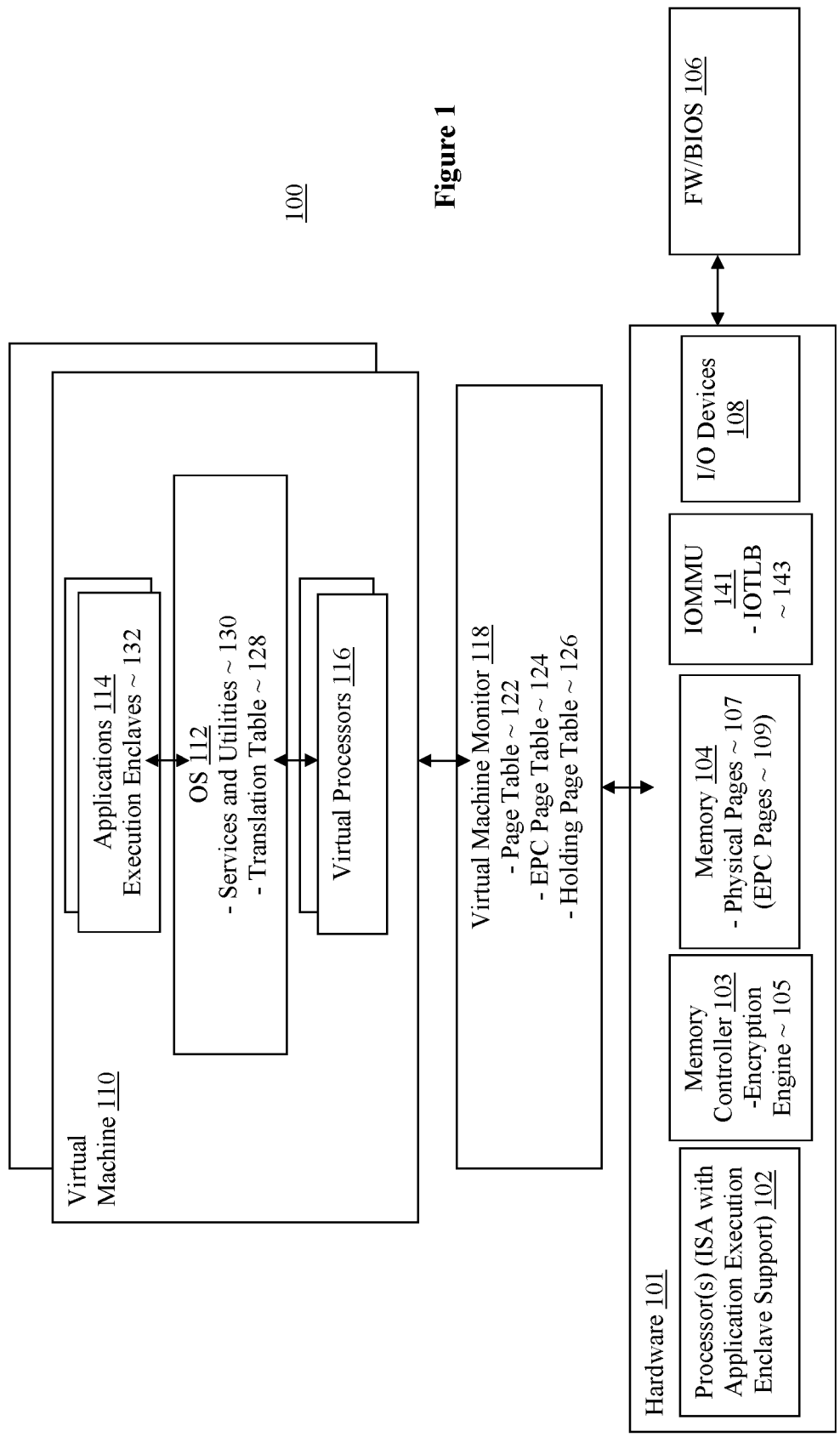
FIG. 1 illustrates an example computer device having the application execution enclave memory page cache management technology of the present disclosure, according to various embodiments.

Apparatuses, methods and storage medium associated with application execution enclave memory page cache management, are disclosed herein. In embodiments, an apparatus may include a physical processor with processor support for application execution enclaves; memory organized into a plurality of host physical memory pages; and a virtual machine monitor to be operated by the physical processor to manage operation of virtual machines formed from virtualization of the physical processor and the memory. Management of operation of the virtual machines may include facilitation of mapping of virtual machine-physical cache pages of the virtual machines to the host physical memory pages, including maintenance of an unallocated subset of the host physical memory pages to receive increased security protection for selective allocation to the virtual machines as virtual machine-physical cache pages of the virtual machines, for virtualization into one or more virtual memory pages of the virtual machines for selective allocation to application execution enclaves of applications of the virtual machines.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a computer device having the application execution enclave memory page cache management technology of the present disclosure, according to various embodiments, is shown. As illustrated, in embodiments, computing device 100 may include hardware 101, firmware (FW)/basic input/output services (BIOS) 106, VMM 118 and virtual machines (VM) 110, communicatively coupled with each other as shown. Hardware 101 may include one or more processors 102 with instruction set architectures (ISA) that support application execution enclaves (i.e., isolated/protected execution areas), memory controller 103, memory 104 having a number of physical memory pages 107 (which may be referred to as host physical memory pages), and IOMMU 141. Each VM 110 may include virtual processors 116 that are virtualization of processors 102, operating system (OS) 112 (which may be referred as guest OS) and application 114. Applications 114 may have corresponding execution enclaves 132 having respective memory page caches, each with one or more virtual memory pages of VM 110 that are virtualization of physical memory pages 107 of memory 104. VMM 118 may be configured to manage operation of VM 110, including support to improve the efficiency of VM 110 in using the ISA support of processor(s) 102 to designate a physical memory page 107 as an EPC page 109 for virtualization and selective allocation to enclave memory page caches of applications 114, to be described more fully below.

In embodiments, the ISA support of processor(s) 102 for application execution enclaves may include support for an instruction to designate a physical memory page 107 to receive increased security protection, e.g., encryption and integrity protection of its content, thereby making the memory page 107, more specifically, a virtualization of the physical memory page 107 in a VM 110, i.e. a virtual memory page of the VM 110, suitable to be allocated as part of the enclave memory page cache of the execution enclave of an application 114. On designation, the physical memory page 107 may be referred to as an enclave memory page cache (EPC)—page 109. In embodiments, memory controller 103 may be configured to control access to memory 104, and memory controller 103 may include encryption engine 105 configured to perform content encryption and integrity protection to provide the increased security protection to the EPC pages 109.

In embodiments, VMM 118 may allow an OS 112 in a VM 110 to have direct access to one or more I/O devices 108 in the hardware. Some of I/O devices 108 may be capable of direct memory access (DMA) and are thus programmed by the OS 112 with VM-physical memory pages/addresses that the I/O device 108 can directly write to. IOMMU 141 may use the page table 122 to translate addresses specified in the DMA by such I/O devices 108 to host physical memory pages/address. This allows VMM 118 to control the set of pages that an OS 112 in a VM 110 can program into an I/O device 108 that it controls. In order to speed up this translation process IOMMU 141 may include an I/O translation lookaside buffer (IOTLB) 143 that caches the translations from VM-physical memory pages/address to host physical memory pages/addresses such that if a translation is found in IO TLB 143, it does not need to reference page table 122.

OS 112 may include a number of services and utilities 130, and translation table 128. Services and utilities 130 may include e.g., an exception handler (not shown). In embodiments, the exception handler may be configured to handle one or more exceptions, including exceptions intentionally or unknowingly triggered to request one or more additional virtualization of EPC memory pages 109 of the VM 110 be dynamically added to an execution enclave memory page cache of an application execution enclave 132. An example of an unknowingly triggered request may be an exception triggered by an unexpected overflow of a heap or stack of an application execution enclave, or violation of memory protection. For further description of the exception handler and growing of the execution enclave memory page cache, see co-pending U.S. patent application Ser. No. 14/849,222, entitled "Application Execution Enclave Memory Page Cache Management Method and Apparatus," filed Sep. 9, 2015. Translation table 128 may be configured to map virtual memory pages/addresses of a VM 110 to VM-physical memory pages/addresses of the VM 110.

Still referring to FIG. 1, as described earlier, VMM 118 may include page table 122 configured to map VM-physical memory pages/addresses of the VM 110 to host physical memory pages/addresses 107 of memory 104. In embodiments, page table 122 may be implemented and referred to as second level address translation table (SLAT) or extended page table (EPT). In embodiments, VM 118 may further include an EPC page table 124 and a holding page table 126 to respectively maintain a pool or subset of unallocated EPC pages 109 and a pool of physical memory pages to be recovered and replenish the pool or subset of unallocated EPC pages 109, to improve the efficiency of VM 110 in using the instruction supported by the ISA of processor(s) 102 to designate a physical memory page 107 as an EPC page 109 for virtualization and selective allocation to enclave memory page caches of application execution enclaves 132 of applications 114, to be described more fully below with references to FIGS. 3-4. In embodiments, the virtual address to host physical address translation as determined by the translation table 128 and page table 122, which may be cached in IO TLB 143.

Except for their ISA that supports application execution enclaves, processor(s) 102 may otherwise be any one of a number of processors known in the art, having one or more processor cores. Memory controller 103 and memory 104 may be any memory controller, and volatile or non-volatile memory known in the art, suitable for controlling memory access, and storing data. In embodiments, hardware 101 may further include I/O devices 108, or other elements (not shown). Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

FW/BIOS 106 may be any one of a number FW/BIOS known in the art. Except for exception handler (not shown) configured to handle exceptions triggered to request additional virtualized EPC pages 109 be dynamically allocated and mapped for an enclave memory page cache of an application enclave 132, OS 112 may likewise be any one of a number of OS known in the art, e.g., the Windows OS from Microsoft® Corporation. Applications 114, except for usage of execution enclaves, may likewise be any one of a number of applications known in the art.

Figure 2:
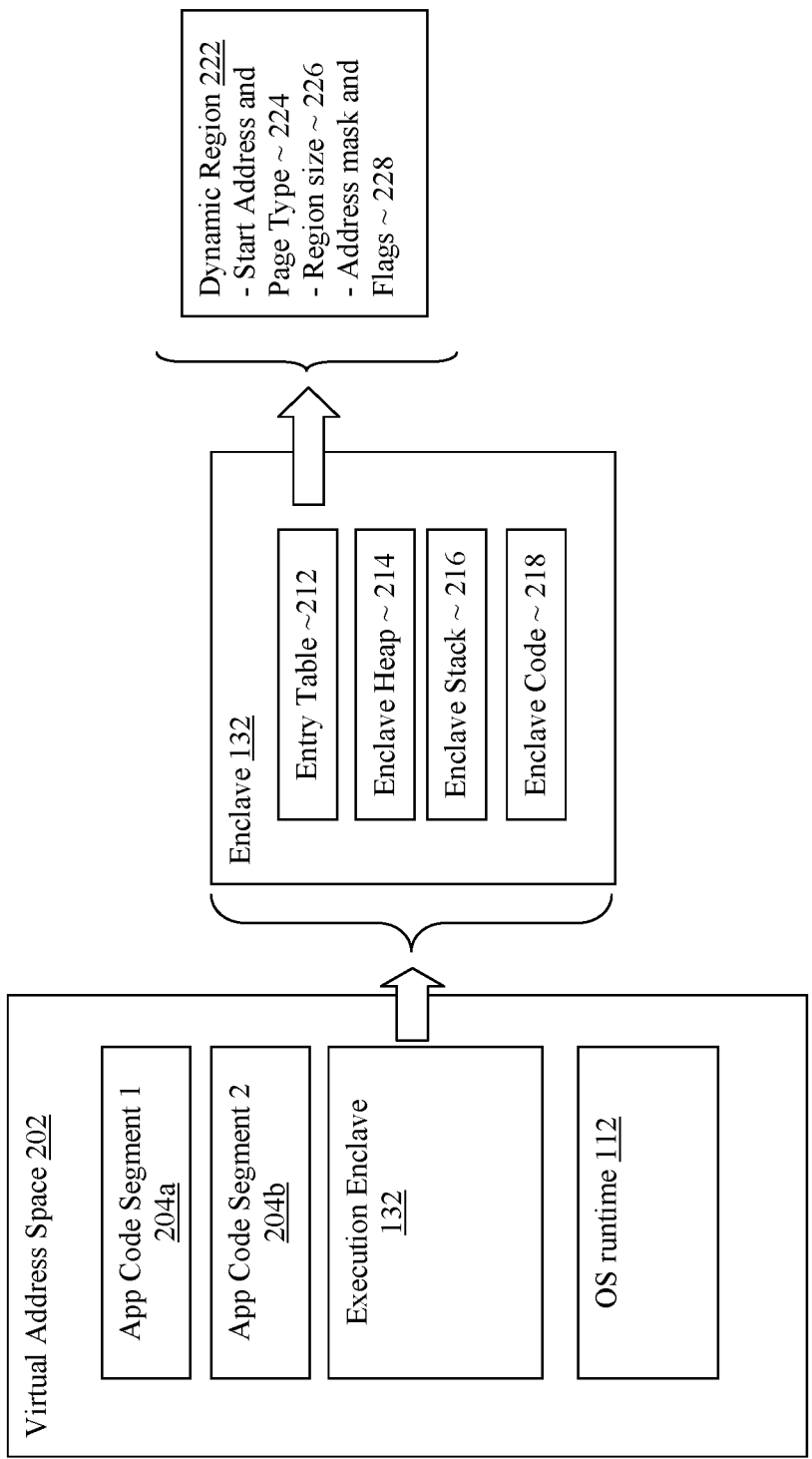
FIG. 2 illustrates a virtual address space view of an application having an application execution enclave, according to various embodiments.

Referring now to FIG. 2, wherein a virtual address space view of an application, according to various embodiments, is illustrated. As shown, within virtual address space 202 may be the runtime environment of OS 112, isolated/protected execution enclave 132 having its own memory page cache, the non-isolated application code segments 204a-204b. Execution enclave 132 may include entry table 212, enclave heap 214, enclave stack 216, and resident enclave code 218. Entry table 212 may include information about various resources within execution enclave 132, dictating which memory pages to accept. In embodiments, entry table 212 may further include information about locations of dynamic regions 222 of execution enclave 132. Dynamic regions 222 of an execution enclave 132 may specify address ranges of the execution enclave 132 where new virtual memory pages of the VM may be mapped. In embodiments, information about a dynamic region 222 may include the starting address of the dynamic region and/or page type 224. Page type 224 may include parameters to be provided to an execution conclave support instruction to augment the memory page cache of an execution enclave, e.g., the EAUG instruction of SGX. Examples of these parameters may include, but are not limited to, read and/or write permissions. Region size 226 may specify a number of memory pages the dynamic region can hold. Address mask and flags 228 may include information on buffer and/or code/data section/segment alignment within the dynamic region (address mask), and information on the growth direction for adding memory pages.

Enclave heap 214 and enclave stack 216 may be similar to conventional software heap and stack, except they are within the enclave's memory page cache, thus isolated and protected, and may be accessed by enclave code 218 resident within enclave 132 only. On entry, execution may flow within enclave code 218, and on completion, exit back to the non-isolated application code segments 204a-204b. Enclave code 218 is not permitted to make any direct calls to OS services and utilities 130 for services. For security/protection, such calls must go through the hosting application 114. Accordingly, on overflow of enclave heap 214 and/or enclave stack 216, an exception may be triggered to transfer execution control to the exception handler of OS 112 to grow the execution enclave memory page cache. Before further describing the present disclosure, it should be noted that while for ease of understanding, only one execution enclave 132 is shown within virtual address space 202, the present disclosure is not so limited. Virtual address space 202 of application 114 may include one or more execution enclaves 132 (each having its own memory page cache).

Figure 3:
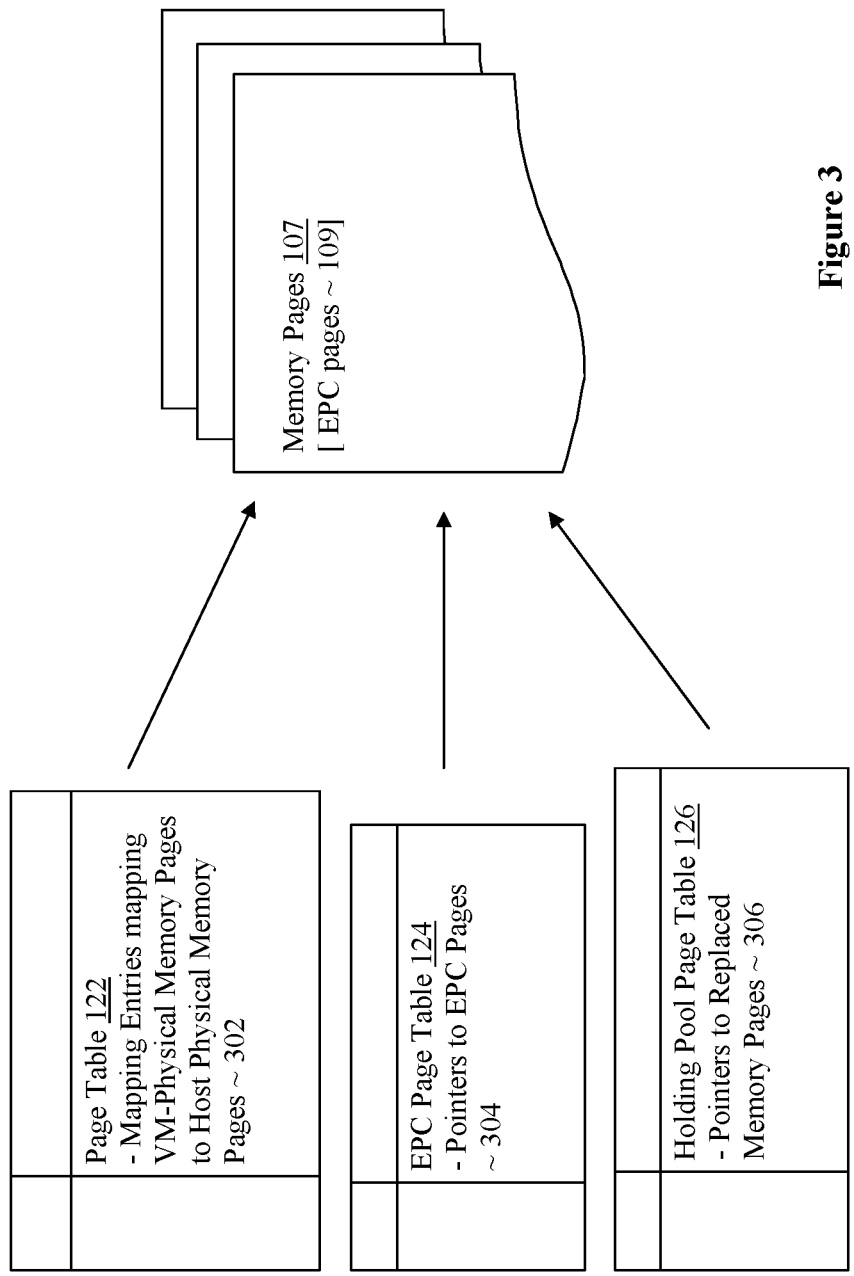
FIG. 3 illustrates examples of the virtual machine monitor's page table, EPC page table and holding page table, according to various embodiments.

Referring now to FIG. 3, wherein the page table, the EPC page table and the holding page table of the VMM, according to various embodiments, are illustrated. As shown, page table 122 may be configured to store a plurality of mapping entries 302 to map VM-physical memory pages/address to host physical memory pages/addresses 107. Similarly, EPC page table 124 may be configured to store a plurality of pointers 304 pointing to a subset of unallocated EPC pages 109 to define and maintain the pool or subset of unallocated EPC pages 109. Likewise, holding pool page table 126 may be configured to store a plurality of pointers 306 pointing to replaced memory pages 107 to be processed to replenish the pool or subset of unallocated EPC pages 109, forming the holding page pool (to be described more fully below with references to FIG. 4).

Figure 4:
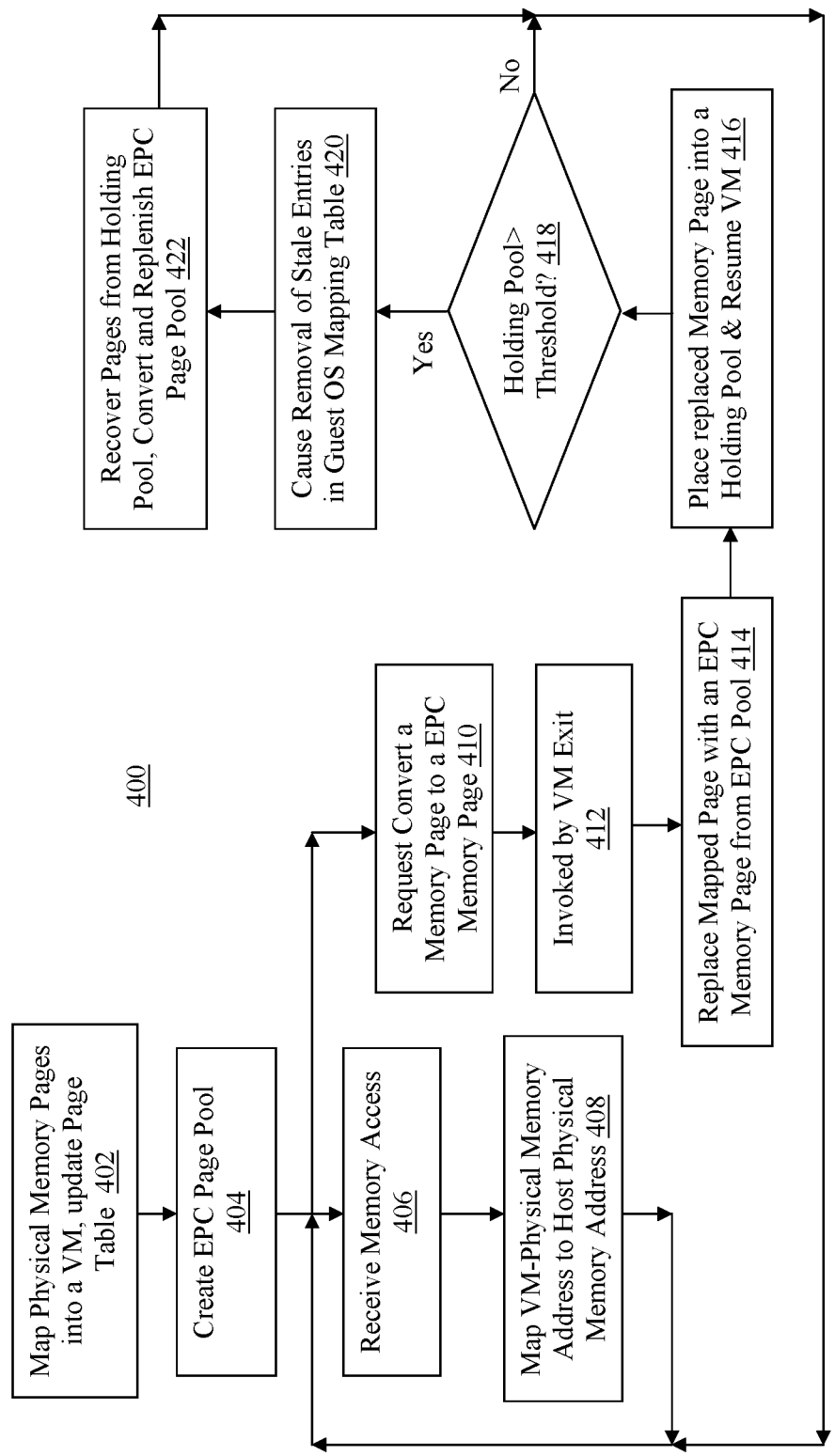
FIG. 4 illustrates an example process of the virtual machine monitor for managing designation of physical memory pages as EPC pages, according to various embodiments.

Referring now to FIG. 4, wherein an example operation process of the virtual machine monitor, including facilitation of designation of a physical memory page as an application enclave eligible memory page, according to various embodiments. As shown, process 400 of VMM, including facilitation of designation of a physical memory page as an application enclave eligible memory page (EPC page), may include operations performed at blocks 402-422. The operations at block 402-422 may be performed, e.g., by VMM 118 of FIG. 1. Accordingly, process 400 also depicts the algorithmic structure of VMM 118 with respect to facilitating the designation of a physical memory page as an EPC page.

Process 400 may start at block 402. At block 402, physical memory pages of the memory of the host computer system may be mapped/allocated to a VM. In embodiments, a page table, e.g., page table 122 of the VMM (FIGS. 1 and 3), may be updated with mapping entries mapping VM-physical memory pages/address to host physical memory pages/addresses. At block 404, the unallocated EPC page pool may be created. In embodiments, an EPC page table, e.g., EPC page table 124 of the VMM (FIGS. 1 and 3), may be updated with the pointers pointing to a plurality of unallocated EPC pages. In embodiments, e.g., SGX, VMM may use a provided instruction to designate a memory page as an EPC page. From block 404, process 400 may proceed to block 406 if a memory access to a physical memory location is received from one of the VMs, or proceed to block 410 if a VM request a physical memory page be converted to a EPC memory page, e.g., the VM invokes the processor instruction to designate or convert a memory page to a EPC memory page with increased security protection.

From block 406, process 400 may proceed to block 408. At block 408, the VM-physical memory address may be mapped to the host physical memory address. The host physical memory address may be provided to e.g., the memory controller, which may service the memory access. On mapping, and outputting the host physical memory address, process 400 may return to block 406 or 410, and continue therefrom.

From block 410, process 400 may proceed to block 412. At block 412, in response to a VM's request to convert a physical memory page to a EPC memory page, the VMM may be invoked, e.g., by the processor causing a VM exit. At block 414, on exit, an EPC page may be selected from the EPC pool to replace the physical memory page to be converted. The page table mapping VM-physical memory pages/addresses to physical memory pages may be updated (e.g., by the VMM). At block 416, the replaced physical memory page (i.e., the physical memory page to be converted to an EPC page) may be placed into the holding pool. The replaced physical memory page may be placed into the holding pool by updating the holding pool page table with a pointer to point to the replaced physical memory page (e.g., by the VMM). The replaced physical memory pages in the holding pool may have stale translation entries in the processor TLB or the IO TLB mapping to them; however this is not an issue as these pages are not used for any purpose, and since they are non EPC pages, they do not lead to any shutdown. Further, at block 416, on placement of the replaced physical memory page into the holding pool, the exited VM may be resumed and continue execution at the next instruction.

At block 418, a determination may be made on whether the number of replaced physical memory pages placed into the holding pool has reached a threshold. If the number of replaced physical memory pages placed into the holding pool has not reached the threshold, process 400 may proceed to block 406 or block 410 as described earlier. However, if the number of replaced physical memory pages placed into the holding pool has reached the threshold, at block 420, corresponding stale entries of the replaced physical memory pages in the various guest OS' translation tables may be removed. In implementation, the removal process may be referred to as TLB shootdown. At block 422, on removal of the stale entries, the replaced physical memory pages may be recovered from the holding pool, converted to EPC pages and added to the EPC page pool to replenish the EPC page pool. Similar to the initial formation of the EPC page pool, the replaced physical memory pages recovered from the holding pool may be designated as EPC pages using a supported instruction, e.g., in the case of SGX. Thereafter, process 400 may proceed to block 406 or block 410 as described earlier.

In embodiments, the threshold may be configurable (e.g., a configurable parameter of the VMM). The threshold may be selected based on a number of factors, including but are not limited to the size of memory, the size of the EPC page pool, the number of application execution enclave, the desired frequency of having the stale entry removal process performed, and so forth.

Process 400 may iterate as many times as necessary during operation.

Figure 5:
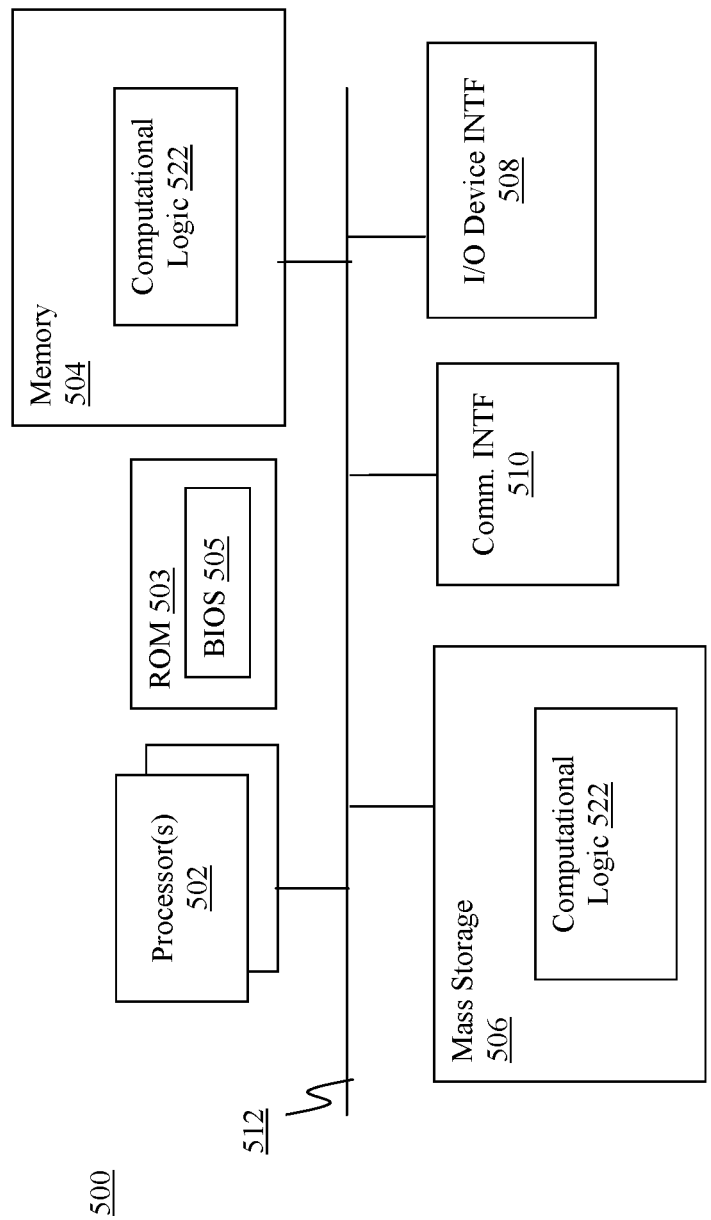
FIG. 5 illustrates an example computer system suitable for use to practice aspects of the present disclosure, according to various embodiments.

FIG. 5 illustrates an example computer system that may be suitable for use to practice selected aspects of the present disclosure. As shown, computer 500 may include one or more processors 502, each having one or more processor cores with application execution enclave support, read-only memory (ROM) 503, and system memory 504. Except for support of application execution enclave, in particular the support for designation of a physical memory page as an EPC page, processors 502 may be any one of a number of processors known in the art. Similarly, ROM 503 may be any one of a number of ROM known in the art, such as, and system memory 504 may be any one of a number of volatile storage known in the art.

Additionally, computer system 500 may include mass storage devices 506. Example of mass storage devices 506 may include, but are not limited to, tape drives, hard drives, compact disc read-only memory (CD-ROM) and so forth. Further, computer system 500 may include input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, ROM 503 may include basic input/output system services (BIOS) 505. System memory 504 and mass storage devices 506 may be employed to store a working copy and a permanent copy of the programming instructions implementing the operations associated with applications 114, OS 112, and/or VMM 118 including its support for application execution enclave memory page cache management, as earlier described, collectively referred to as computational logic 522. The various elements may be implemented by assembler instructions supported by processor(s) 502 or high-level languages, such as, for example, C, that can be compiled into such instructions.

The number, capability and/or capacity of these elements 510-512 may vary, depending on whether computer system 500 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 510-512 are known, and accordingly will not be further described.

Figure 6:
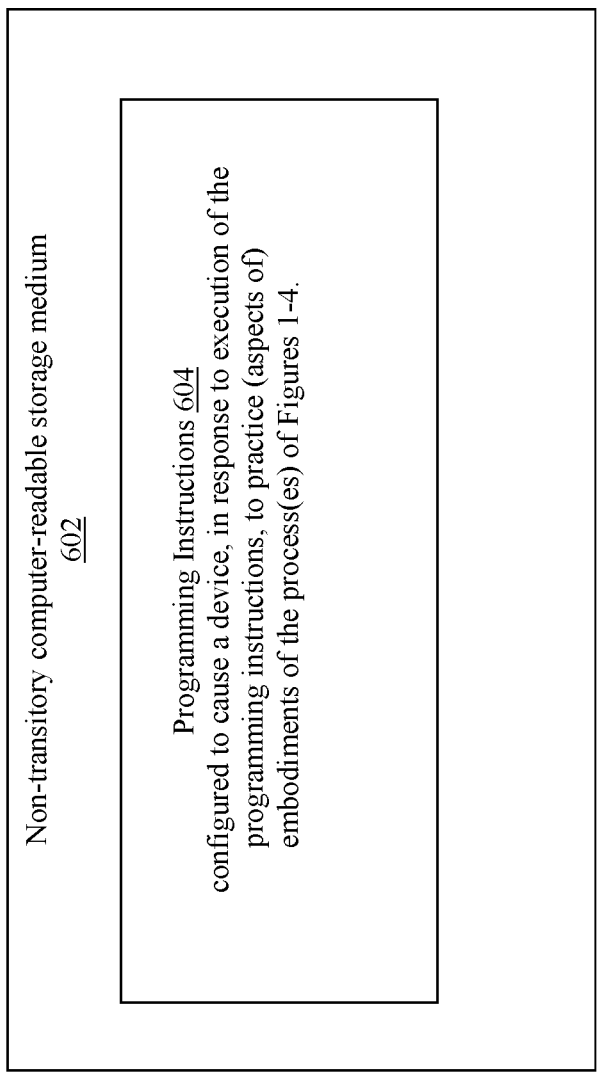
FIG. 6 illustrates a storage medium having instructions for practicing methods described with references to FIGS. 1-4, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) applications 114, OS 112, and/or VMM 118 including its support for application execution enclave memory page cache management. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 502 may be packaged together with memory having aspects of VMM 118. For one embodiment, at least one of processors 502 may be packaged together with memory having aspects of VMM 118, to form a System in Package (SiP). For one embodiment, at least one of processors 502 may be integrated on the same die with memory having aspects of VMM 118. For one embodiment, at least one of processors 502 may be packaged together with memory having aspects of VMM 118, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing, comprising: a physical processor with processor supports for application execution enclaves; memory organized into a plurality of host physical memory pages; and a virtual machine monitor to be operated by the physical processor to manage operation of virtual machines formed from virtualization of the physical processor and the memory, wherein management of operation of the virtual machines may include facilitation of mapping of virtual machine-physical memory pages of the virtual machines to the host physical memory pages, including maintenance of an unallocated subset of the host physical memory pages to receive increased security protection for selective allocation to the virtual machines as virtual machine-physical memory pages of the virtual machines, for virtualization into one or more virtual pages of the virtual machines for selective allocation to application execution enclaves of applications of the virtual machines.

Example 2 may be example 1, wherein the virtual machine monitor may allocate a host physical memory page from the unallocated subset of the host physical memory pages to receive increased security protection to a virtual machine as a virtual machine-physical memory page, in response to a request from the virtual machine to designate a virtual machine-physical memory page of the virtual machine to receive the increased security protection.

Example 3 may be example 2, wherein the virtual machine monitor may allocate a host physical memory page from the unallocated subset of the host physical memory pages to receive increased security protection to replace the corresponding host physical memory page of the virtual machine-physical memory page to be designated to receive the increased security protection.

Example 4 may be example 3, wherein the virtual machine monitor may further maintain a holding pool of replaced host physical memory pages; wherein the virtual machine monitor may place the replaced corresponding host physical memory page into the holding pool of replaced host physical memory pages, on replacement of the corresponding host physical memory page with the host physical memory page from the from the unallocated subset of the host physical memory pages to receive increased security protection.

The apparatus of claim 4, wherein the virtual machine monitor may recover the replaced host physical memory pages in the holding pool back into the unallocated subset of the host physical memory pages to receive increased security protection, in response to the holding pool reaching a threshold number of replaced host physical memory pages.

Example 5 may be example 2, wherein the processor supports for application execution enclaves may include a processor instruction for a virtual machine to designate a virtual machine-physical memory page to receive the increased security protection, and wherein the virtual machine may request the designation by invoking the processor instruction.

Example 7 may be example 6; wherein in response to the invocation of the processor instruction by a virtual machine, the physical processor may cause an exit of the virtual machine.

Example 8 may be example 7, wherein the virtual machine monitor may allocate a host physical memory page from the unallocated subset of the host physical memory pages to receive increased security protection to replace the corresponding host physical memory page of the virtual machine-physical memory page to be designated to receive the increased security protection, in response to the virtual machine exit.

Example 9 may be example 8, wherein on allocation of a host physical memory page from the unallocated subset of the host physical memory pages to receive increased security protection to replace the corresponding host physical memory page of the virtual machine-physical memory page to be designated to receive the increased security protection, the virtual machine monitor may resume the virtual machine.

Example 10 may be example 8, wherein each virtual machine may maintain a first translation table to map virtual pages of the virtual machine to virtual machine-physical memory pages, wherein to facilitate the mapping of virtual machine-physical memory pages of the virtual machines to the host physical memory pages, the virtual machine monitor may maintain a second translation table to map the virtual machine-physical memory pages to the host physical memory pages; and wherein the apparatus may further comprise an input/output management unit having a third translation table that caches entries of the first and second translation page tables associated with direct management access.

Example 11 may be example 10, wherein to allocate a host physical memory page from the unallocated subset of the host physical memory pages to receive increased security protection to replace the corresponding host physical memory page of the virtual machine-physical memory page to be designated to receive the increased security protection, the virtual machine monitor may update the second translation table.

Example 12 may be example 11, wherein the virtual machine monitor may further maintain a holding pool of replaced host physical memory pages; wherein the virtual machine monitor may place the replaced corresponding host physical memory page into the holding pool of replaced host physical memory pages, on replacement of the corresponding host physical memory page with the host physical memory page from the from the unallocated subset of the host physical memory pages to receive increased security protection; and wherein the virtual machine monitor may recover the replaced host physical memory pages in the holding pool back into the unallocated subset of the host physical memory pages to receive increased security protection, in response to the holding pool reaching a threshold number of replaced host physical memory pages, and as part of the recovery process, the virtual machine monitor may cause the virtual machines to invalidate corresponding mapping entries in the first translation tables of the virtual machines and the third translation table in the input/output memory management unit.

Example 13 may be any one of examples 1-12, further comprising an encryption engine to encrypt or integrity protect content of the host physical memory pages to receive increased security protection.

Example 14 may be a method for computing, comprising: maintaining, by a virtual machine monitor of a computer device having a physical processor with supports for application execution enclaves, and memory organized into a plurality of host physical memory pages, an unallocated subset of the host physical memory pages to receive increased security protection; and selectively allocating, by the virtual machine monitor, the host physical memory pages from the unallocated subset of the host physical memory pages to receive increased security protection to virtual machines of the computer device to replace virtual machine-physical memory pages of the virtual machines that are to be virtualized into virtual pages of the virtual machines for selective allocation to application execution enclaves of applications of the virtual machines.

Example 15 may be example 14, wherein selectively allocating may comprise allocating a host physical memory page from the unallocated subset of the host physical memory pages to receive increased security protection to a virtual machine as a virtual machine-physical memory page, in response to a request from the virtual machine to designate a virtual machine-physical memory page of the virtual machine to receive the increased security protection.

Example 16 may be example 15, wherein allocating may comprise allocating a host physical memory page from the unallocated subset of the host physical memory pages to receive increased security protection to replace the corresponding host physical memory page of the virtual machine-physical memory page to be designated to receive the increased security protection.

Example 17 may be example 16, further comprising maintaining, by the virtual machine monitor, a holding pool of replaced host physical memory pages; wherein allocating may further comprise placing the replaced corresponding host physical memory page into the holding pool of replaced host physical memory pages, on replacement of the corresponding host physical memory page with the host physical memory page from the from the unallocated subset of the host physical memory pages to receive increased security protection.

Example 18 may be example 17, further comprising recovering, by the virtual machine monitor, the replaced host physical memory pages in the holding pool back into the unallocated subset of the host physical memory pages to receive increased security protection, in response to the holding pool reaching a threshold number of replaced host physical memory pages.

Example 19 may be example 15, wherein the processor supports for application execution enclaves may include a processor instruction for a virtual machine to designate a virtual machine-physical memory page to receive the increased security protection, and wherein the virtual machine may request the designation by invoking the processor instruction.

Example 20 may be example 19; further comprising causing, by the physical processor, in response to the invocation of the processor instruction by a virtual machine, an exit of the virtual machine.

Example 21 may be example 20, wherein selectively allocating may comprise allocating a host physical memory page from the unallocated subset of the host physical memory pages to receive increased security protection to replace the corresponding host physical memory page of the virtual machine-physical memory page to be designated to receive the increased security protection, in response to the virtual machine exit.

Example 22 may be example 21, further comprising on allocation of a host physical memory page from the unallocated subset of the host physical memory pages to receive increased security protection to replace the corresponding host physical memory page of the virtual machine-physical memory page to be designated to receive the increased security protection, resuming by the virtual machine monitor, the virtual machine.

Example 23 may be example 21, wherein each virtual machine may maintain a first translation table to map virtual pages of the virtual machine to virtual machine-physical memory pages, wherein to facilitate the mapping of virtual machine-physical memory pages of the virtual machines to the host physical memory pages, the virtual machine monitor may maintain a second translation table to map the virtual machine-physical memory pages to the host physical memory pages; and wherein the apparatus may further comprise an input/output management unit having a third translation table that caches entries of the first and second translation page tables associated with direct management access.

Example 24 may be example 23, wherein allocating a host physical memory page from the unallocated subset of the host physical memory pages to receive increased security protection to replace the corresponding host physical memory page of the virtual machine-physical memory page to be designated to receive the increased security protection may comprise updating the second translation table.

Example 25 may be example 24, further comprising maintaining, by the virtual machine monitor, a holding pool of replaced host physical memory pages; wherein maintaining may comprise placing the replaced corresponding host physical memory page into the holding pool of replaced host physical memory pages, on replacement of the corresponding host physical memory page with the host physical memory page from the from the unallocated subset of the host physical memory pages to receive increased security protection; and recovering, by the virtual machine monitor, the replaced host physical memory pages in the holding pool back into the unallocated subset of the host physical memory pages to receive increased security protection, in response to the holding pool reaching a threshold number of replaced host physical memory pages, and as part of the recovery process, causing the virtual machines to invalidate corresponding mapping entries in the first translation tables of the virtual machines and the third translation table in the input/output memory management unit.

Example 26 may be any one of examples 14-25, further comprising encrypting or integrity protecting content of the host physical memory pages to receive increased security protection.

Example 27 may be one or more computer-readable media comprising instructions that cause a computer device having a physical processor with supports for application execution enclaves, and memory organized into a plurality of host physical memory pages, in response to execution of the instructions by the physical processor of the computer device, to provide a virtual machine monitor, to: maintain an unallocated subset of the host physical memory pages to receive increased security protection; and selectively allocate the host physical memory pages from the unallocated subset of the host physical memory pages to receive increased security protection to virtual machines of the computer device to replace virtual machine-physical memory pages of the virtual machines that are to be virtualized into virtual pages of the virtual machines for selective allocation to application execution enclaves of applications of the virtual machines.

Example 28 may be example 27, wherein the virtual machine monitor may allocate a host physical memory page from the unallocated subset of the host physical memory pages to receive increased security protection to a virtual machine as a virtual machine-physical memory page, in response to a request from the virtual machine to designate a virtual machine-physical memory page of the virtual machine to receive the increased security protection.

Example 29 may be example 28, wherein the virtual machine monitor may allocate a host physical memory page from the unallocated subset of the host physical memory pages to receive increased security protection to replace the corresponding host physical memory page of the virtual machine-physical memory page to be designated to receive the increased security protection.

Example 30 may be example 29, wherein the virtual machine monitor may further maintain a holding pool of replaced host physical memory pages; wherein the virtual machine monitor may place the replaced corresponding host physical memory page into the holding pool of replaced host physical memory pages, on replacement of the corresponding host physical memory page with the host physical memory page from the from the unallocated subset of the host physical memory pages to receive increased security protection.

Example 31 may be example 30, wherein the virtual machine monitor may recover the replaced host physical memory pages in the holding pool back into the unallocated subset of the host physical memory pages to receive increased security protection, in response to the holding pool reaching a threshold number of replaced host physical memory pages.

Example 32 may be example 28, wherein the processor supports for application execution enclaves may include a processor instruction for a virtual machine to designate a virtual machine-physical memory page to receive the increased security protection, and wherein the virtual machine may request the designation by invoking the processor instruction.

Example 33 may be example 32; wherein in response to the invocation of the processor instruction by a virtual machine, the physical processor may cause an exit of the virtual machine.

Example 34 may be example 33, wherein the virtual machine monitor may allocate a host physical memory page from the unallocated subset of the host physical memory pages to receive increased security protection to replace the corresponding host physical memory page of the virtual machine-physical memory page to be designated to receive the increased security protection, in response to the virtual machine exit.

Example 35 may be example 34, wherein on allocation of a host physical memory page from the unallocated subset of the host physical memory pages to receive increased security protection to replace the corresponding host physical memory page of the virtual machine-physical memory page to be designated to receive the increased security protection, the virtual machine monitor may resume the virtual machine.

Example 36 may be example 34, wherein each virtual machine may maintain a first translation table to map virtual pages of the virtual machine to virtual machine-physical memory pages, wherein to facilitate the mapping of virtual machine-physical memory pages of the virtual machines to the host physical memory pages, the virtual machine monitor may maintain a second translation table to map the virtual machine-physical memory pages to the host physical memory pages; and wherein the computer device may further comprise an input/output management unit having a third translation table that caches entries of the first and second translation page tables associated with direct management access.

Example 37 may be example 36, wherein to allocate a host physical memory page from the unallocated subset of the host physical memory pages to receive increased security protection to replace the corresponding host physical memory page of the virtual machine-physical memory page to be designated to receive the increased security protection, the virtual machine monitor may update the second translation table.

Example 38 may be example 37, wherein the virtual machine monitor may further maintain a holding pool of replaced host physical memory pages; wherein the virtual machine monitor may place the replaced corresponding host physical memory page into the holding pool of replaced host physical memory pages, on replacement of the corresponding host physical memory page with the host physical memory page from the from the unallocated subset of the host physical memory pages to receive increased security protection; and wherein the virtual machine monitor may recover the replaced host physical memory pages in the holding pool back into the unallocated subset of the host physical memory pages to receive increased security protection, in response to the holding pool reaching a threshold number of replaced host physical memory pages, and as part of the recovery process, the virtual machine monitor may cause the virtual machines to invalidate corresponding mapping entries in the first translation tables of the virtual machines and the third translation table in the input/output memory management unit.

Example 39 may be any one of examples 27-38, further comprising an encryption engine to encrypt or integrity protect content of the host physical memory pages to receive increased security protection.

Example 40 may be an apparatus for computing, comprising: means for maintaining on a computer device having a physical processor with supports for application execution enclaves, and memory organized into a plurality of host physical memory pages, an unallocated subset of the host physical memory pages to receive increased security protection; and means for selectively allocating the host physical memory pages from the unallocated subset of the host physical memory pages to receive increased security protection to virtual machines of the computer device to replace virtual machine-physical memory pages of the virtual machines that are to be virtualized into virtual pages of the virtual machines for selective allocation to application execution enclaves of applications of the virtual machines.

Example 41 may be example 40, wherein means for selectively allocating may comprise means for allocating a host physical memory page from the unallocated subset of the host physical memory pages to receive increased security protection to a virtual machine as a virtual machine-physical memory page, in response to a request from the virtual machine to designate a virtual machine-physical memory page of the virtual machine to receive the increased security protection.

Example 42 may be example 41, wherein means for allocating may comprise means for allocating a host physical memory page from the unallocated subset of the host physical memory pages to receive increased security protection to replace the corresponding host physical memory page of the virtual machine-physical memory page to be designated to receive the increased security protection.

Example 43 may be example 42, further comprising means for maintaining a holding pool of replaced host physical memory pages; wherein allocating may further comprise placing the replaced corresponding host physical memory page into the holding pool of replaced host physical memory pages, on replacement of the corresponding host physical memory page with the host physical memory page from the from the unallocated subset of the host physical memory pages to receive increased security protection.

Example 44 may be example 43, further comprising means for recovering the replaced host physical memory pages in the holding pool back into the unallocated subset of the host physical memory pages to receive increased security protection, in response to the holding pool reaching a threshold number of replaced host physical memory pages.

Example 45 may be example 41, wherein the processor supports for application execution enclaves may include a processor instruction for a virtual machine to designate a virtual machine-physical memory page to receive the increased security protection, and wherein the virtual machine may request the designation by invoking the processor instruction.

Example 46 may be example 45; further comprising means for causing, in response to the invocation of the processor instruction by a virtual machine, an exit of the virtual machine.

Example 47 may be example 46, wherein means for selectively allocating may comprise means for allocating a host physical memory page from the unallocated subset of the host physical memory pages to receive increased security protection to replace the corresponding host physical memory page of the virtual machine-physical memory page to be designated to receive the increased security protection, in response to the virtual machine exit.

Example 48 may be example 47, further comprising means for, on allocation of a host physical memory page from the unallocated subset of the host physical memory pages to receive increased security protection to replace the corresponding host physical memory page of the virtual machine-physical memory page to be designated to receive the increased security protection, resuming the virtual machine.

Example 49 may be example 47, wherein each virtual machine may maintain a first translation table to map virtual pages of the virtual machine to virtual machine-physical memory pages, wherein to facilitate the mapping of virtual machine-physical memory pages of the virtual machines to the host physical memory pages, the virtual machine monitor may maintain a second translation table to map the virtual machine-physical memory pages to the host physical memory pages; and wherein the apparatus may further comprise an input/output management unit having a third translation table that caches entries of the first and second translation page tables associated with direct management access.

Example 50 may be example 49, wherein means for allocating a host physical memory page from the unallocated subset of the host physical memory pages to receive increased security protection to replace the corresponding host physical memory page of the virtual machine-physical memory page to be designated to receive the increased security protection may comprise means for updating the second translation table.

Example 51 may be example 50, further comprising means for maintaining, by a holding pool of replaced host physical memory pages; wherein maintaining may comprise placing the replaced corresponding host physical memory page into the holding pool of replaced host physical memory pages, on replacement of the corresponding host physical memory page with the host physical memory page from the from the unallocated subset of the host physical memory pages to receive increased security protection; and means for recovering the replaced host physical memory pages in the holding pool back into the unallocated subset of the host physical memory pages to receive increased security protection, in response to the holding pool reaching a threshold number of replaced host physical memory pages, and as part of the recovery process, causing the virtual machines to invalidate corresponding mapping entries in the first translation tables of the virtual machines and the third translation table in the input/output memory management unit.

Example 52 may be example 40-51, further comprising means for encrypting or integrity protecting content of the host physical memory pages to receive increased security protection.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
a physical processor with processor supports for application execution enclaves;
one or more memory units organized into a plurality of host physical memory pages; and
a virtual machine monitor to be operated by the physical processor to manage operation of virtual machines formed from virtualization of the physical processor and the one or more memory units, wherein management of operation of the virtual machines includes facilitation of mapping of virtual machine-physical memory pages of the virtual machines to the host physical memory pages, including maintenance by the virtual machine monitor of a subset of the host physical memory pages as a reserved pool of application enclave eligible host physical memory pages to receive increased security protection for replacement allocation to the virtual machines and virtualization into one or more virtual pages of the virtual machines for replacement allocation to application execution enclaves of applications of the virtual machines, wherein the application enclave eligible host physical memory pages have no or invalidated corresponding mapping entries in a first translation table of the virtual machines and a third translation table in an input/output memory management unit, wherein the application enclave eligible host physical memory pages are allocated to the virtual machines to replace non-application enclave eligible host physical memory pages previously allocated to the virtual machines, in response to the virtual machines requesting conversion of the previously allocated non-application enclave eligible host physical memory pages to application enclave eligible host physical memory pages;
wherein each virtual machine is to maintain an instance of the first translation table to map virtual pages of the virtual machine to virtual machine-physical memory pages, wherein to facilitate the mapping of virtual machine-physical memory pages of the virtual machines to the host physical memory pages, the virtual machine monitor is to maintain a second translation table to map the virtual machine-physical memory pages to the host physical memory pages, and wherein the apparatus further comprises the input/output management unit having the third translation table that caches entries of the first and second translation page tables associated with direct management access; and
wherein to receive increased security protection comprises to cryptographically bind a selected host physical memory page to an application execution enclave.

2. The apparatus of claim 1, wherein the virtual machine monitor is to place the replaced non-application enclave eligible host physical memory pages previously allocated to the virtual machines into a holding pool of replaced non-application enclave eligible host physical memory pages, on their replacement by the application enclave eligible host physical memory pages.

3. The apparatus of claim 2, wherein the virtual machine monitor is to recover the replaced non-application enclave eligible host physical memory pages in the holding pool back into the reserved pool as application enclave eligible memory pages of the host physical memory pages, in response to the holding pool reaching a threshold number of replaced non-application enclave eligible host physical memory pages.

4. The apparatus of claim 1, wherein the processor supports for application execution enclaves include a processor instruction to convert a previously allocated non-application enclave eligible host physical memory page to an application enclave eligible host physical memory page to receive the increased security protection, and wherein a virtual machine requests a conversion by invoking the processor instruction.

5. The apparatus of claim 4, wherein in response to the invocation of the processor instruction by a virtual machine, the physical processor is to cause an exit of the virtual machine.

6. The apparatus of claim 5, wherein the virtual machine monitor is to allocate an application enclave eligible host physical memory page from the reserved pool to replace the previously allocated non-application enclave eligible host physical memory page, in response to the virtual machine exit.

7. The apparatus of claim 6, wherein on allocation of the application enclave eligible host physical memory page from the reserve pool to replace the previously allocated non-application enclave eligible host physical memory page, the virtual machine monitor is to resume the virtual machine.

8. The apparatus of claim 1, wherein on allocation of the application enclave eligible host physical memory page from the reserve pool to replace the previously allocated non-application enclave eligible host physical memory page, the virtual machine monitor updates the second translation table.

9. The apparatus of claim 1, further comprising an encryption engine to encrypt or integrity protect content of the application enclave eligible host physical memory pages to provide the increased security protection.

10. A method for computing, comprising:
maintaining, by a virtual machine monitor of a computer device having a physical processor with supports for application execution enclaves, and one or more memory units organized into a plurality of host physical memory pages, a subset of the host physical memory pages as a reserve pool of application enclave eligible host physical memory pages to receive increased security protection; and
allocating, by the virtual machine monitor, the application enclave eligible host physical memory pages from the reserve pool to virtual machines of the physical processor, to be virtualized into virtual pages of the virtual machines for allocation to application execution enclaves of applications of the virtual machines, wherein the application enclave eligible host physical memory pages are allocated to the virtual machines to replace non-application enclave eligible host physical memory pages previously allocated to the virtual machines, in response to the virtual machines requesting conversion of the previously allocated non-application enclave eligible host physical memory pages to application enclave eligible host physical memory pages, and wherein the application enclave eligible host physical memory pages have no or invalidated corresponding mapping entries in a first translation table of the virtual machines and a third translation table in an input/output memory management unit;

maintaining by each virtual machine an instance of the first translation table to map virtual pages of the virtual machine to virtual machine-physical memory pages, wherein to facilitate the mapping of virtual machine-physical memory pages of the virtual machines to the host physical memory pages, maintaining by the virtual machine monitor a second translation table to map the virtual machine-physical memory pages to the host physical memory pages, and maintaining by the input/output management unit cache entries of the first and second translation page tables associated with direct management access in the third translation table; and wherein to receive increased security protection comprises cryptographically binding an application enclave eligible host physical memory page to an application execution enclave.

11. The method of claim 10, further comprising;

maintaining, by the virtual machine monitor, a holding pool of replaced non-application enclave eligible host physical memory pages; wherein allocating further comprises placing the replaced non-application enclave eligible host physical memory pages into the holding pool, on their replacements; and recovering, by the virtual machine monitor, the replaced non-application enclave eligible host physical memory pages in the holding pool back into the reserve pool as application enclave eligible host physical memory pages.

12. The method of claim 10, wherein the processor supports for application execution enclaves include a processor instruction for a virtual machine to convert a previously allocated non-application enclave eligible host physical memory page to an application enclave eligible host physical memory page, and wherein the virtual machine requests a conversion by invoking the processor instruction; and the method further comprises causing, by the physical processor, in response to the invocation of the processor instruction by a virtual machine, an exit of the virtual machine.

13. The method of claim 12, wherein allocating comprises allocating an application enclave eligible host physical memory page from the reserve pool to replace the non-application enclave eligible host physical memory page, in response to the virtual machine exit.

14. One or more computer-readable media comprising instructions that cause a computer device having a physical processor with supports for application execution enclaves, and one or more memory units organized into a plurality of host physical memory pages, in response to execution of the instructions by the physical processor of the computer device, to provide a virtual machine monitor, to:

maintain a subset of the host physical memory pages as a reserve pool of application enclave eligible memory pages to receive increased security protection, wherein the application enclave eligible memory pages of the host physical memory pages have no or invalidated corresponding mapping entries in first translation tables of virtual machines managed by the virtual machine monitor and a third translation table in an input/output memory management unit of the computer device; and allocate the application enclave eligible host physical memory pages from the reserve pool to replace previous allocated non-application enclave eligible host physical memory pages, to be virtualized into virtual pages of the virtual machines for allocation to application execution enclaves of applications of the virtual machines;

wherein the application enclave eligible host physical memory pages are allocated to the virtual machines to replace non-application enclave eligible host physical memory pages previously allocated to the virtual machines, in response to the virtual machines requesting conversion of the previously allocated non-application enclave eligible host physical memory pages to application enclave eligible host physical memory pages;

wherein each virtual machine is to maintain an instance of the first translation table to map virtual pages of the virtual machine to virtual machine-physical memory pages, wherein to facilitate the mapping of virtual machine-physical memory pages of the virtual machines to the host physical memory pages, the virtual machine monitor is to maintain a second translation table to map the virtual machine-physical memory pages to the host physical memory pages; and wherein the computer device further comprises the input/output management unit having the third translation table that caches entries of the first and second translation page tables associated with direct management access;

wherein to receive increased security protection comprises to cryptographically bind a selected host physical memory page to an application execution enclave.

15. The one or more computer-readable media of claim 14, wherein the virtual machine monitor is to further maintain a holding pool of replaced non-application enclave eligible host physical memory pages; wherein the virtual machine monitor is to place the replaced non-application enclave eligible host physical memory pages into the holding pool of replaced non-application enclave eligible host physical memory pages, on their replacements;

wherein the virtual machine monitor is to recover the replaced non-application enclave eligible host physical memory pages in the holding pool back into the reserve pool as application enclave eligible host physical memory pages, in response to the holding pool reaching a threshold number of replaced non-application enclave eligible-host physical memory pages.

16. The one or more computer-readable media of claim 14, wherein the processor supports for application execution enclaves include a processor instruction for a virtual machine to convert non-application enclave eligible host physical memory pages previously allocated to the virtual machine to application enclave eligible host physical memory pages by invoking the processor instruction;

wherein in response to the invocation of the processor instruction by a virtual machine, the physical processor is to cause an exit of the virtual machine;

wherein the virtual machine monitor is to allocate an application enclave eligible host physical memory page from the reserve pool to replace an non-application enclave eligible host physical memory page previously allocated to the virtual machine, in response to the virtual machine exit.

17. The one or more computer-readable media of claim 16, wherein on allocation of an application enclave eligible host physical memory page from the reserve pool to replace the non-application enclave eligible host physical memory page previously allocated to the virtual machine-, the virtual machine monitor is to resume the virtual machine; and wherein to allocate the application enclave eligible host physical memory page from the reserve pool, the virtual machine monitor updates the second translation table.

* * * * *

UNITED STATES PATENT AND TRADEMARK OFFICE
CERTIFICATE OF CORRECTION

PATENT NO. : 10,671,542 B2
APPLICATION NO. : 15/200796
DATED : June 2, 2020
INVENTOR(S) : Vedvyas Shanbhogue et al.

It is certified that error appears in the above-identified patent and that said Letters Patent is hereby corrected as shown below:

In the Claims

Column 22
Line 61, "…an non-application…" should read – "…a non-application…"

Column 23
Line 2, "…machine-,…" should read – "…machine,…"

Signed and Sealed this
Eleventh Day of August, 2020

Andrei Iancu
*Director of the United States Patent and Trademark Office*